A. LAWRENCE.
MILK PAIL.
APPLICATION FILED MAR. 31, 1909.
937,615.
Patented Oct. 19, 1909.
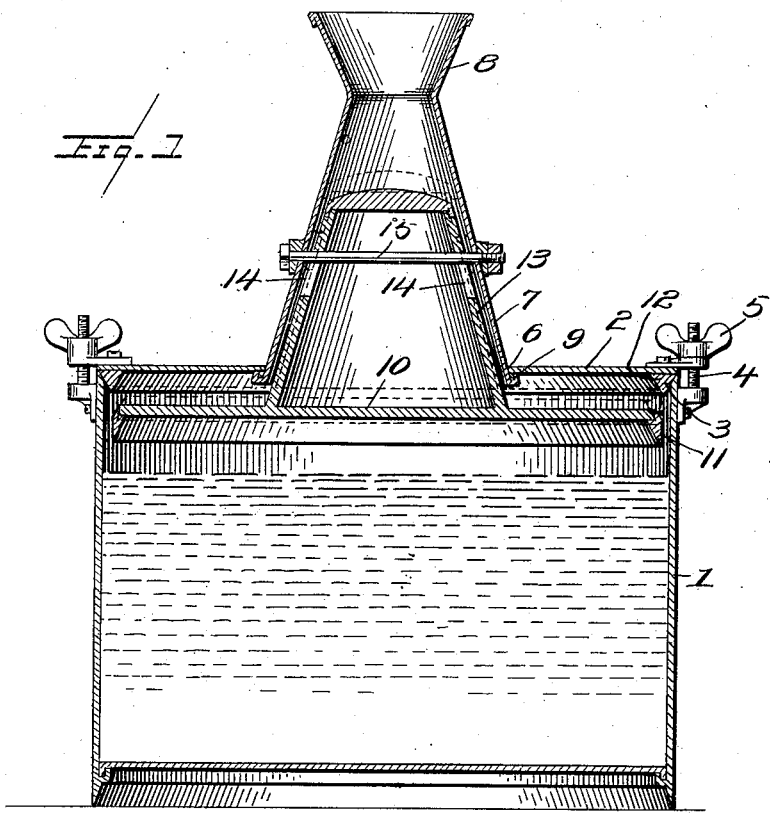
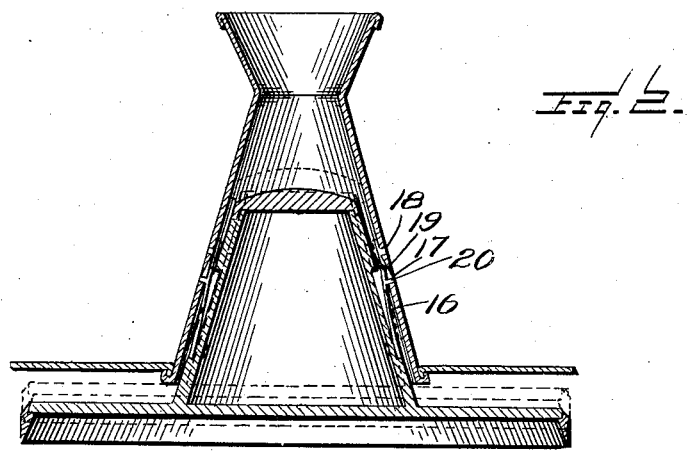
Witnesses
H. F. Doyle.
D. W. Gould.
Inventor
Albert Lawrence.
By Victor J. Evans
Attorney

UNITED STATES PATENT OFFICE.

ALBERT LAWRENCE, OF LOS ANGELES, CALIFORNIA.

MILK-PAIL.

937,615.  Specification of Letters Patent.  Patented Oct. 19, 1909.

Application filed March 31, 1909. Serial No. 486,871.

*To all whom it may concern:*

Be it known that I, ALBERT LAWRENCE, a citizen of the United States, residing at Los Angeles, in the county of Los Angeles and State of California, have invented new and useful Improvements in Milk-Pails, of which the following is a specification.

The invention relates to an improvement in milk pails, being directed more particularly to a cover designed to automatically close in the event the pail is tipped over to prevent escape of the milk.

The main object of the present invention is the provision of a milk pail cover constructed to permit the free delivery of the milk into the pail in ordinary uses when the pail is upright and to automatically close by the pressure of the milk to prevent spilling of the milk if the pail should be tipped over.

The invention will be described in the following specification, reference being had particularly to the accompanying drawings, in which:—

Figure 1 is a view in vertical section, illustrating the preferred form of the present invention. Fig. 2 is a broken similar view of the cover, showing a modified locking means for the plug.

Referring particularly to the accompanying drawings, my improved cover is designed for use in connection with a milk pail, as 1, which, so far as the present invention is concerned, may be constructed in any desired manner and of any size.

The cover comprises a disk-like section 2 of a size to fit the upper edge of the pail, being preferably provided with an edge gasket 3 to frictionally engage the inner surface of the upper edge of the cover and with bolts 4 and thumb nuts 5 and coöperating parts whereby the disk may be quickly secured in an airtight manner to the pail body. The disk is formed with a central opening 6, from which rises a cone-shaped conduit 7, which at the upper end diverges to provide a funnel shaped receiver 8, whereby the delivery of the milk into the conduit 7 is facilitated. The conduit 7 is preferably a fixed part of the disk 2, being secured thereto by the tie flange connection 9 illustrated in Fig. 1.

Fitted for movement within the pail is what I term a sealing disk 10 of solid construction and having a diameter slightly less than that of the pail. The disk is formed with a depending edge flange 11, and the sealing gasket 3 of the disk 2 is beveled on its inner edge, as at 12, so that when the disk 10 is in its uppermost or operative position, the edge of the flange 11 will frictionally engage the edge 12 of the gasket 3 to seal the conduit 7 against the interior of the pail below the disk 10.

The disk 10 is provided with a centrally arranged conical plug 13, having a diameter somewhat less than that of the conduit 7 and conforming in sectional contour to the sectional contour of the conduit. The plug, which is of hollow construction is closed at the upper end, and in the preferred form, illustrated in Fig. 1, formed at diametrically opposite points with elongated slots 14 to receive a rod 15, the end of which projects through openings in the conduit 7 and are secured therebeyond in an appropriate manner.

In Fig. 2 I have shown a slightly modified form, which, so far as the cover proper, sealing disk, and coöperating parts are concerned, is identical with that of the preferred form, the modification residing in the means for securing the sealing disk in sealing position. In this instance the plug 13 is provided at diametrically opposite points with spring tongues 16 carrying laterally projecting pins 17 at their upper ends, and the wall of the conduit 7 is provided at diametrically opposed points with openings 18 of a size to receive the pins 17 and below said openings with guideways 19, terminating at their lower ends in abrupt shoulders 20, the base wall of the guideways 19 being inclined upwardly and inwardly, as shown.

In operation the pail when upright provides free communication between the conduits 7 and the interior of the pail, thereby permitting free flow of the material into said pail. In the event, however, the pail should tip over the pressure of the material within the pail will be sufficient to force the sealing disk into sealing contact with the gaskets 3 and thereby prevent the escape of the material. In Fig. 1 the movement of the disk to inoperative or open position is controlled by gravity so that upon restoring the pail to an upright position the disk will again drop to establish communication between the conduit and the interior of the pail. In Fig. 2, however, the movement of the disk under pressure of the contained milk when the pail has tipped over will force the sealing disk to operative position and at the same time cause the pins 20 of the arms 16 to engage in the openings 18 in the conduit, thereby locking the disk in sealing position and requiring that the pins be forced from the openings 18 before the disk can be returned to normal position.

Having thus described the invention what is claimed as new, is:—

1. A milk pail, a cover therefor, a conduit rising from the cover, a disk normally disposed within the pail and adapted in one position to seal communication between the conduit and pail, means for limiting movement of the disk in both directions, and means carried by the disk for sealing coöperation with the cover.

2. A milk pail, a cover therefor, a conduit rising from the cover, a disk normally disposed within the pail and adapted in one position to seal communication between the conduit and pail, a plug carried by the disk and movable within the conduit, means to engage the plug to limit its movement in both directions, and complementary sealing means carried by the cover and disk.

3. A milk pail, a cover therefor, a conduit rising from the cover, a disk normally disposed within the pail and adapted in one position to seal communication between the conduit and pail, a plug carried by the disk and movable within the conduit, means to engage the plug to limit its movement in both directions, and means carried by the cover for sealing coöperation with the disk.

In testimony whereof I affix my signature in presence of two witnesses.

ALBERT LAWRENCE.

Witnesses:
　Joseph V. Brown,
　Charles M. Backman.